United States Patent [19]

Moore

[11] 4,012,054

[45] Mar. 15, 1977

[54] BICYCLE SAFETY DEVICE

[76] Inventor: Paul A. Moore, 9825 Park Lane Court, Dallas, Tex. 75220

[22] Filed: Nov. 19, 1975

[21] Appl. No.: 633,272

[52] U.S. Cl. .......................... 280/239; 280/1.189; 280/293

[51] Int. Cl.² ....................................... B62D 63/00

[58] Field of Search ............ 280/204, 1.189, 239, 280/289, 1.184, 293, 295

[56] References Cited

UNITED STATES PATENTS

| 1,537,729 | 5/1925 | Banks | 280/1.189 |
|---|---|---|---|
| 3,284,096 | 11/1966 | Hansen | 280/239 X |
| 3,427,037 | 2/1969 | Marasco | 280/1.189 |
| 3,653,679 | 4/1972 | Howard | 280/239 X |
| 3,888,511 | 6/1975 | Parrilla | 280/239 |

FOREIGN PATENTS OR APPLICATIONS

| 895,316 | 1/1945 | France | 280/293 |

*Primary Examiner*—Joseph F. Peters, Jr.
*Assistant Examiner*—Terrance L. Siemens
*Attorney, Agent, or Firm*—Hubbard, Thurman, Turner & Tucker

[57] ABSTRACT

A bicycle safety apparatus for stabilizing a bicycle when the front wheel of the bicycle is elevated above the ground which includes rollers or wheels that are mounted on the ends of rigid arms that extend outwardly and rearwardly from the back wheel of the bicycle. The rollers or wheels are maintained in spaced apart relationship with the axis of the rollers or wheels being in approximately the same horizontal plane as the rear axle of the bicycle, when both wheels of the bicycle are in contact with the ground. The rollers or wheels of the safety apparatus are substantially smaller than the wheels of the bicycle such that when the front end of the bicycle is elevated, a three point contact is made by the rear wheel of the bicycle and the spaced apart rollers or wheels to stabilize the bicycle and prevent it from tipping over backwards.

5 Claims, 9 Drawing Figures

U.S. Patent    Mar. 15, 1977    4,012,054
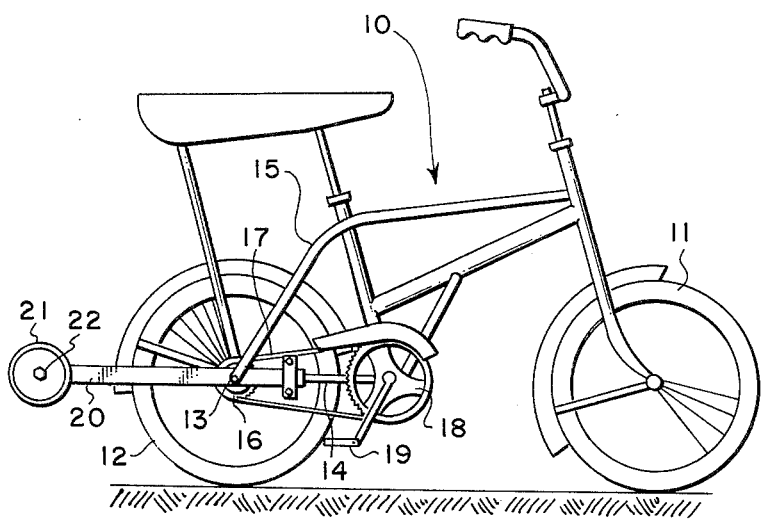
FIG. 1
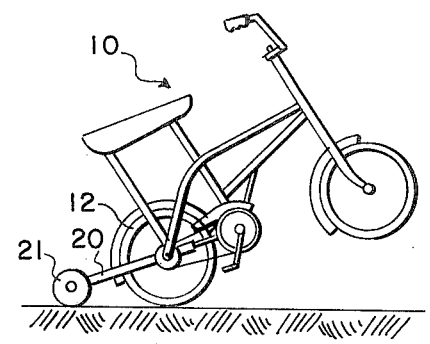
FIG. 2
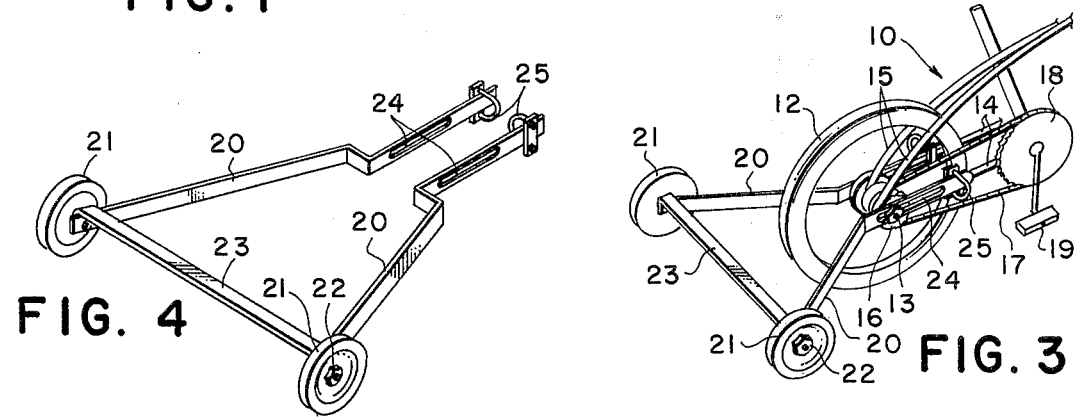
FIG. 4
FIG. 3
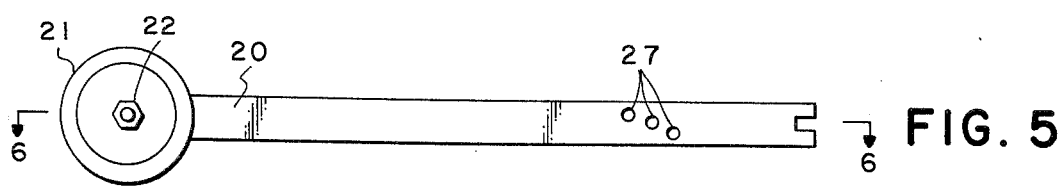
FIG. 5
FIG. 6
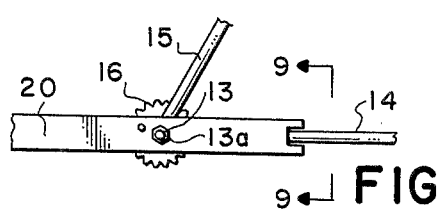
FIG. 8
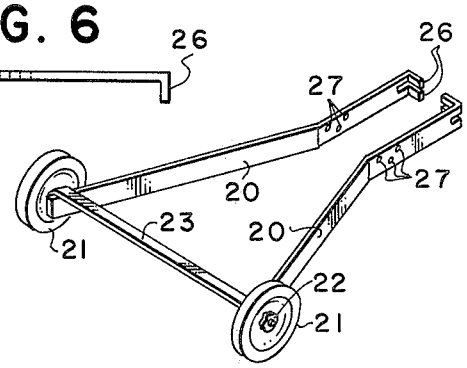
FIG. 7
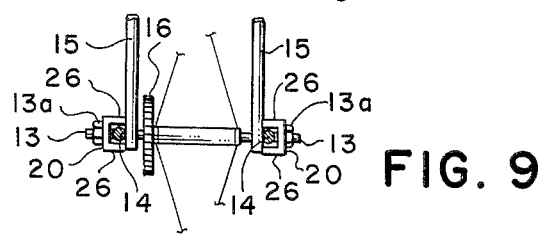
FIG. 9

BICYCLE SAFETY DEVICE

BACKGROUND OF THE INVENTION

This invention relates to an improved safety apparatus for attachment to a bicycle to prevent the bicycle from tipping over backwards when the front wheel thereof is raised above the ground. In another aspect, this invention relates to an improved safety apparatus for a bicycle to stabilize the bicycle when the front wheel of the bicycle is elevated above the ground. In still another aspect, this invention relates to a wheeled vehicle that includes two primary wheels for supporting the vehicle and rider thereof and secondary wheels to stabilize the vehicle and rider when only one of the primary wheels is in contact with the ground.

In recent years, an unusual fad has been developed by teenagers and other youngsters in the riding of two-wheel vehicles such as conventional bicycles and motorcycles. The fad involves a stunt or trick wherein the two-wheel vehicle is ridden by raising the front wheel of the vehicle above ground level and balancing the vehicle on the rear wheel while it is ridden. In slang terms, this feat is known as "popping wheelies".

In order to perform the above-mentioned stunts and feats of daring on a two-wheel vehicle, it is necessary for the rider to have a very good sense of balance whereby the rider of the vehicle can elevate the front wheel of the vehicle so as to change the center of gravity of the vehicle to where it is directly above the rear wheel. Unfortunately, if the rider should become overbalanced rearwardly, the vehicle is prone to turn over or tip over backwards, causing possible injury to the rider. Additionally, when two-wheel vehicles, such as conventional bicycles and motorcycles are ridden with the front wheel elevated for long distances, it is very easy to become over-balanced if the rear wheel of the vehicle should strike a small object or encounter a small, unexpected hill or incline. In such instances, very serious, and sometimes fatal, head and neck injuries have been suffered by riders.

When the two-wheel vehicles are ridden in the wheel-up position at slow speeds, an additional problem is encountered in that the vehicle is relatively unstable and will often tip over or turn over to the side. This also has caused serious injuries to riders of such vehicles.

It is, therefore, apparent that there is a need for a safety device for a two-wheel vehicle that will prevent the vehicle from tipping over rearwardly and to stabilize the vehicle when the vehicle is ridden with the front wheel elevated.

SUMMARY OF THE INVENTION

Accordingly, it is an object of this invention to provide an improved safety device for a bicycle to stabilize the vehicle when it is ridden with the front wheel elevated above the ground. It is another object of this invention to provide an improved safety device to prevent a bicycle from tipping over backwards when the front wheel of the bicycle is elevated above the ground level. It is yet another object of this invention to provide a wheeled vehicle that is primarily ridden with two wheels supporting the vehicle and rider and having auxiliary wheels to stabilize the vehicle and rider when only one of the primary wheels is in contact with the ground.

Other aspects, objects and advantages of this invention will be apparent to those skilled in the art from the following description and appended claims.

In the instant invention, a safety apparatus for stabilizing a bicycle when the front wheel of the bicycle is elevated above the ground level includes a pair of oppositely disposed rigid arm means that are adapted to be affixed to the rear portion of the bicycle. The arm means extend outwardly and rearwardly and terminate at ends that are spaced apart and are rearward of the rear wheel of the bicycle. The ends of the arm means are in approximately the same horizontal plane as the rear axle of the bicycle, when both wheels of the bicycle are in contact with the ground. Suitable roller means are attached to the ends of the arm means in such a manner that they will rotate in the same direction as the direction of rotation of the rear wheel of the bicycle. Generally, the roller means are wheels that have a diameter substantially smaller than the diameter of the rear wheel of the bicycle. Thus, when the front wheel of the bicycle is elevated above the ground, a three point contact is made by the rear wheel of the bicycle and the two spaced-apart roller means affixed to the rigid arms extending rearwardly and outwardly from the rear wheel of the bicycle. By proper adjustment of the length of the rigid arms, the bicycle can be prevented from tipping over backwards or sideways when the front wheel thereof is raised above the ground level.

DESCRIPTION OF THE DRAWINGS

FIG. 1 is a side view of a bicycle with both wheels in contact with the ground showing the attachment of the safety device of this invention.

FIG. 2 is a side view of a bicycle with the apparatus of this invention attached thereto showing the operation of the device when the front wheel of the bicycle is raised above the ground.

FIG. 3 is a perspective view showing the attachment of the safety device of this invention to a bicycle.

FIG. 4 is a perspective view of one preferred embodiment of this invention showing adjustable means for attaching the apparatus to a bicycle.

FIG. 5 is a side view of one of the preferred arm means utilized in the apparatus of this invention.

FIG. 6 is a sectional view taken along line 6—6 of FIG. 5.

FIG. 7 is a perspective view of another preferred embodiment of this invention showing the assembly of the arm means illustrated in FIGS. 5 and 6.

FIG. 8 is a side view of a portion of the rear of a bicycle showing the attachment of the apparatus of FIG. 7 thereto.

FIG. 9 is a sectional view taken along line 9—9 of FIG. 8.

DESCRIPTION OF PREFERRED EMBODIMENTS

The preferred embodiments of the present invention can best be described by referring to the drawings. In the drawings, only a few of the preferred embodiments of the invention have been illustrated.

In FIGS. 1, 2 and 3, bicycle 10 is equipped with front wheel 11 and rear wheel 12. Rear axle 13 of rear wheel 12 is affixed to the frame of the bicycle by passing rear axle 13 through suitable apertures in the frame and tightening axle nuts 13A around the threaded end portions of rear axle 13. Horizontal frame member 14 and vertical frame member 15 of the bicycle converge and join at a common point and suitable apertures are present in the point of convergence whereby the threaded portion of rear axle 13 can be inserted through the apertures and the rear axle is securely affixed to the frame by tightening axle nut 13A.

Rear wheel 12 contains suitable bearings (not shown) whereby rear wheel 12 is free to rotate about rear axle 13. Suitable sprocket wheel 16 is affixed to rear wheel 12 and engages drive chain 17 which passes over drive crank 18 whereby the rider of the vehicle may supply the necessary motive force for propelling the vehicle by means of pedals 19 that are affixed to drive crank 18. For illustration purposes, the spokes of wheels 11 and 12 are not shown. It is, of course, understood that the spokes extend from the outer portions of wheels 11 and 12 to the central portion of the wheels and that the central portion of the wheels contain bearing means that surround the respective axles to allow the wheels to rotate freely about the axles. It is understood that primary wheels 11 and 12 are used to support the vehicle and rider when the vehicle is ridden in a normal manner.

The improved safety apparatus of this invention is shown affixed to bicycle 10 in FIGS. 1, 2 and 3. Oppositely opposed arm means 20 are mounted on the bicycle on each side of rear wheel 12 and extend outwardly and rearwardly from rear axle 13. Arm means 20 extend outwardly and rearwardly from said rear axle in a substantially horizontal plane when both wheels of the bicycle are in contact with the ground. Arm means 20 terminate at spaced-apart ends that are rearward and outward of the rear wheel 12. Roller means 21 are affixed to arm means 20 adjacent the outer ends of arms means 20. The roller means 21 are, in effect, auxiliary wheels that engage the ground when the front primary wheel 11 is elevated above ground level. Roller means 21 can be any suitable type of roller apparatus that will rotate freely about an axis or axle. It is preferred, however, that roller means 21 be in the form of freely rotating wheels that have a diameter that is substantially smaller than the diameter of rear wheel 12. As used herein, a substantially smaller diameter of the roller means shall mean a diameter of from about one-sixteenth to about one-half of the diameter of the rear wheel of the vehicle. In the case of a conventional bicycle having a rear wheel diameter of about 20 inches, it has been found that roller wheels 21 having diameters of about 5 inches are quite suitable for use in this invention. Roller means 21 can be secured to the outer ends of arm 20 by means of suitable roller wheel axles 22.

Any suitable means for securing roller wheels 21 to roller wheel axle 22 may be utilized such as conventional cotter keys, bolts, friction caps, and the like. The outer ends of arm means 20 are rigidly held in spaced apart relationship by means of brace member 23. Brace member 23 can be of any suitable material, such as a steel bar that is affixed to the outer ends of arm means 20 or, as illustrated in FIG. 7, brace member 23 can be a suitable length of circular steel material that serves as the roller axle means on which roller means 21 are mounted. As shown in FIG. 7, roller axle 23 passes through suitable apertures in the outer ends of arm means 20 and roller means 21 are mounted on the outer ends of axle member 23.

In order to maximize the stability of a vehicle utilizing the apparatus of this invention, it is important that brace member 23 be of sufficient strength to rigidly hold the ends of arm means 20 in a spaced-apart relationship. As will be discussed hereinafter, by rigidly holding the ends of arm means 20 in spaced-apart relationship, a very stable three point contact between the ground and rear wheel 12 and roller means 21 can be achieved. Without the incorporation of brace member 23, a considerable amount of stability is sacrificed and it would be necessary to construct arm means 20 of much heavier and more expensive material in order to achieve even minimal stability of the device. Roller means 21 are affixed to the outer ends of arm means 20 in such a configuration that roller means 21 will have substantially the same direction of rotation as the direction rotation of rear wheel 12 when the device is installed on the bicycle.

The apparatus of this invention is installed on the bicycle in the general configuration as illustrated in FIGS. 1, 2 and 3. As noted from these figures, the apparatus is installed in such a manner that the axis of roller means 21 is in substantially the same horizontal plane as rear axle 13 of the bicycle. It is important that arm means 20 be rigidly affixed to the bicycle in order to insure maximum stability of the bicycle when the front wheel of the bicycle is elevated above ground level. As shown in FIG. 2, when the front wheel 11 of bicycle 10 is elevated above the ground, roller means 21 engage the ground thereby forming a very stable three point contact between rear wheel 12 and the pair of space-apart roller means 21. By the rigid attachment of arm means 20 to the rear portion of the bicycle, the bicycle is very stable and will not tip over backwards, even when the rider may shift the center of gravity behind the rear axle of the bicycle. Additionally, the three point contact between rear wheel 12 and the spaced-apart pair of roller means 21 provide a considerable amount of stability to prevent the bicycle from tipping over sideways.

It has been found that on a conventional bicycle having a rear wheel with a diameter of about 20 inches, that the distance between rear wheels 21 should be in the order of about 10 to 20 inches. Thus, when the axis of rotation of rear wheels 21 is from about 12 to 24 inches behind rear axle 13 of the bicycle, maximum stability can be achieved. In such a configuration, it is virtually impossible for a rider to tip the bicycle over backwards because of the rigid mounting of the arm members 20 to the rear portion of the bicycle and because of the rigid bracing of roller means 21 in spaced-apart relationship.

When the device of this invention is properly installed on a bicycle, the rider of the bicycle may choose to ride the vehicle for long distances, with the front wheel elevated by virtue of the very stable three point support offered by the device.

It is, of course, necessary that arm members 20 be rigidly attached to the rear portion of the bicycle. The attachment can be by any suitable means and can be attached entirely to the frame of the bicycle or in a preferred embodiment, arm means 20 can be rigidly affixed to the bicycle by means of a suitable attachment to rear axle 13 of the bicycle. Therefore, by inserting rear axle 13 of the bicycle through suitable slots or apertures in arm members 20 and thereafter tightening rear axle nuts 13a down over arm members 20, the apparatus can be rigidly affixed to the vehicle.

One preferred embodiment of this invention for attaching arm members 20 to the bicycle is illustrated in FIGS. 3 and 4 wherein elongated, slotted apertures 24 are disposed adjacent the ends of arm means 20 in the areas where the arm means will be affixed to the bicycle. Elongated, slotted apertures 24 are of such size that the threaded portion of rear axle 13 of the bicycle may be passed through the slotted apertures and axle nut 13a can be tightened to secure the arm members to the frame of the bicycle.

The effective length of arm members 20 or the distance from rear axle 13 to the axis of rotation of roller means 21 can be adjusted by sliding elongated, slotted apertures 24 to desired locations with respect to rear axle 13 and thereafter tightening axle nuts 13a to secure the arm means to the bicycle. Since it is important that arm means 20 be rigidly affixed to the rear portion of the bicycle, it has been found desirable to additionally secure arm means 20 to the bicycle by means of the U-bolts or other suitable means such as upstanding flanges and the like.

As illustrated in FIGS. 2, 3 and 4, U-bolts 25 can be passed around horizontal frame member 14 of the bicycle and around arm means 20 to secure the arm means to the bicycle frame. Additionally, one of the preferred embodiments of this invention utilizes an arm means having upstanding arm flanges 26 that are sized to fit over and around horizontal frame member 14 of the bicycle. As more clearly illustrated in FIGS. 5, 6 and 7, upstanding arm flanges 26 are positioned such that the space between the flanges closely coincides with the diameter of horizontal frame member 14. As illustrated in FIGS. 8 and 9, arm flanges 26 are placed above and below horizontal frame member 14 in such a manner that arm flanges 26 engage horizontal frame member 14 above and below the frame member to prevent arm member 20 from rotating about rear axle 13 when the arm member is affixed to rear axle 13 by means of axle nut 13A. By using arm flanges 26, it is not necessary to utilize U-bolts 25 to install the safety device on a bicycle.

In another preferred embodiment of this invention, arm member 20 can have a plurality of mounting apertures 27 located in the portion of the arm member where it will be affixed to rear axle 13 of the bicycle. As illustrated in FIG. 5, the plurality of mounting apertures are located at different points along the length and height of arm member 20 such that a considerable degree of adjustability in the effective length and height of the arm member and roller means 21 can be achieved by selection of different mounting apertures 27 for mounting the device to the bicycle by inserting axle 13 into the properly selected mounting aperture 27.

It will be understood that selection of the various materials of construction of the elements of the apparatus of this invention is a matter of choice. However, the use of high tensile strength steel is preferred since there is a considerable amount of stress and strain exerted on the various components in use.

It will, of course, be understood that the term "bicycle", as used throughout this specification, is directed toward conventional rider-powered bicycles and also to motor-powered two-wheel vehicles such as motorcycles and the like. Thus, while the figures appear to illustrate only conventional bicycles, the safety device of this invention is also applicable to motor-powered bicycle vehicles.

Various modifications and changes may be made in the foregoing description without departing from the spirit and scope of this invention.

What is claimed is:
1. A safety apparatus for stabilizing a bicycle when the front wheel of said bicycle is elevated above ground level which comprises:
 a. a pair of oppositely disposed rigid arm means adapted to be rigidly affixed to the rear portion of said bicycle, one on each side of the rear wheel of said bicycle, and further being adapted to extend rearwardly and outwardly in a substantially horizontal direction from the rear axle of said bicycle when both the rear and front wheels of said bicycle are in contact with the ground, said rigid arm means terminating at ends spaced apart and rearward of the rear wheel of said bicycle;
 b. means for rigidly affixing said rigid arm means to the rear portion of said bicycle;
 c. a pair of roller wheels having a diameter substantially smaller than the diameter of said rear wheel of said bicycle;
 d. means to affix one of each of said roller wheels in rotatable relationship to each of said arm means adjacent the ends thereof; and
 e. a brace means to affix to the ends of said arm means to rigidly hold said ends in spaced-apart relationship.

2. The apparatus of claim 1 wherein said means for rigidly affixing said arm means to said bicycle include means to rigidly affix said arm means to the rear axle of said bicycle.

3. The apparatus of claim 2 wherein said means for rigidly affixing said arm means to said rear axle of said bicycle include elongated, slotted apertures adapted to receive the protruding rear axle of said bicycle and further being adapted to slide along said protruding rear axle to adjust the distance from said rear axle to said roller means.

4. The apparatus of claim 2 wherein said means for rigidly affixing said arm means to said rear axle of said bicycle include a plurality of apertures in vertical, spaced-apart relation adapted to receive the protruding rear axle of said bicycle and further being adapted to adjust the height of said roller means from the ground when both wheels of said bicycle are in contact with the ground.

5. A wheeled vehicle including:
 a. a frame means;
 b. a front primary wheel and a rear primary wheel affixed to said frame means and adapted to rotate about a front axle and a rear axle to support said vehicle and a rider;
 c. means to propel said vehicle;
 d. a pair of oppositely disposed rigid arm means rigidly affixed to said vehicle, one on each side of the rear wheel of said vehicle and extending rearwardly and outwardly in a substantially horizontal direction from the rear axle of said vehicle when both the front and rear wheels of said vehicle are in contact with the ground, said rigid arm means terminating at ends spaced apart and rearward of the rear wheel of said vehicle;
 e. a pair of roller wheels having a diameter substantially smaller than the diameter of said rear wheel of said vehicle with one of each of said roller wheels rotatably affixed to each of the ends of said arm means; and
 f. a brace means to affix to the ends of said arm means to rigidly hold said ends in spaced-apart relationship.

* * * * *